INVENTORS
PETER M. REILAND
ERNEST S. REILAND
BY Paul, Paul Moore
ATTORNEYS

March 17, 1936.  P. M. REILAND ET AL  2,034,420
FAUCET
Filed Oct. 13, 1934  3 Sheets-Sheet 2
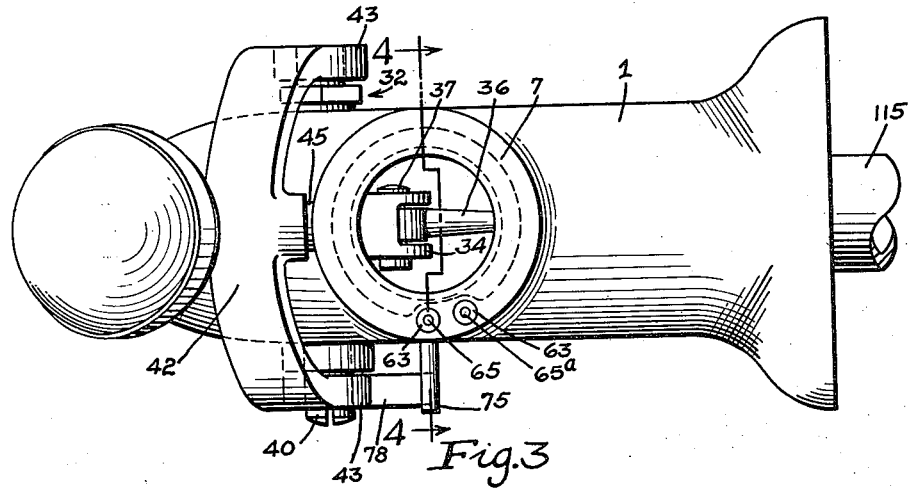
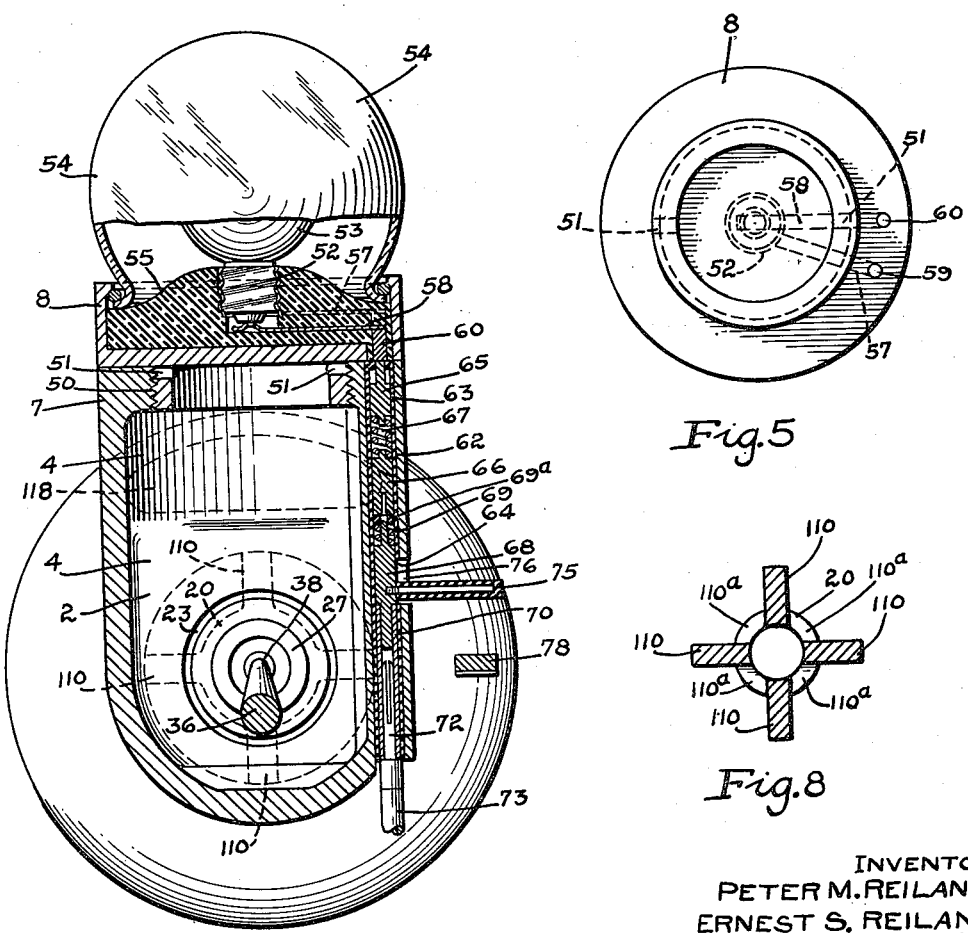
INVENTORS
PETER M. REILAND
ERNEST S. REILAND
BY
ATTORNEYS

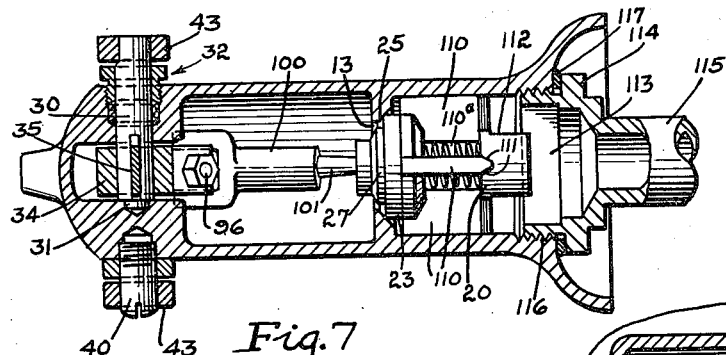
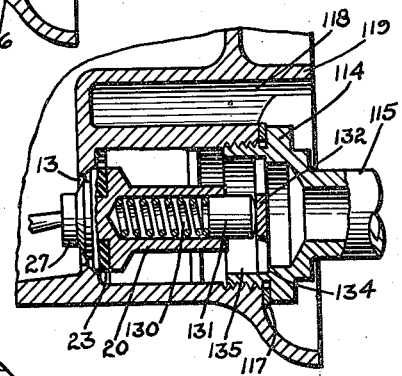
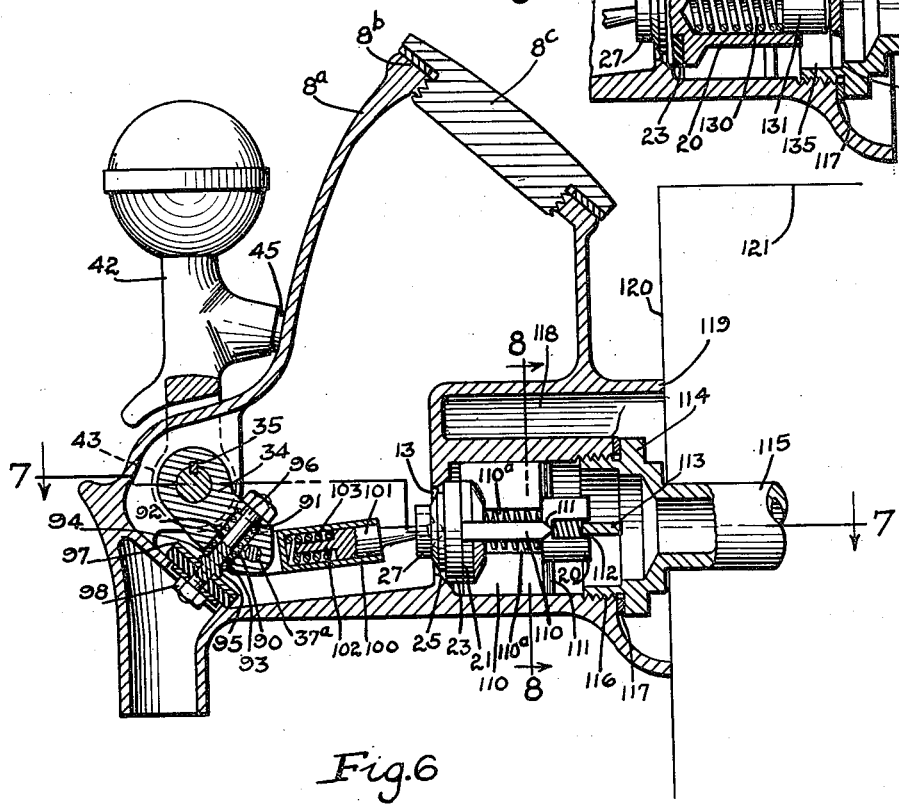

Patented Mar. 17, 1936

2,034,420

UNITED STATES PATENT OFFICE 2,034,420

FAUCET

Peter M. Reiland and Ernest S. Reiland, St. Paul, Minn., assignors to Dunlap Corporation, St. Paul, Minn.

Application October 13, 1934, Serial No. 748,204

22 Claims. (Cl. 225—8)

This invention relates to improvements in faucets, particularly designed for dispensing charged beverages in which foam is generated as a result of release of pressure, and this invention is an improvement over an invention for faucet disclosed in an application bearing Serial Number 703,372, and in which we are co-inventors with another. The present invention has found valuable application in dispensing beer, but is applicable for properly dispensing other gas-charged liquids.

The present invention, like that of the above mentioned application, makes "striking" of the beer or waiting for foam subsidence thereof unnecessary, because the faucet is provided with an expansion chamber to which the beer or equivalent liquid, is delivered from the source of pressure supply, and from which it is dispensed only after foaming has largely subsided. The flow velocity of the beverage is so reduced at a certain stage in the dispensing operation that the amount of foam entering the glass is substantially reduced. This reduction of velocity is important and the beer is caused to flow along a slightly slanting bottom of the expansion chamber, at a substantially reduced pressure and velocity, toward the discharge opening which leads downwardly.

Objects of the invention are: to dispense beer and other charged liquid without delivering any substantial amount of foam into the receptacle or glass; to provide a system of beer-dispensing which includes a gas relief device in the beer supply line operative in conjunction with an ordinary beer faucet or of some special type of beer faucet and cooperative to obtain delivery of beer into a receptacle without a substantial amount of foam; to provide a new valve structure; to provide a new means for operating a valve structure in a beer faucet; to provide a visible signal indicating to a customer that the faucet is being operated to draw liquid; to make the operation of the signal dependent on the disposing of a brand or to the mark or symbol in a predetermined visual relation to a customer; to provide an adjustable vent for a beer dispensing and foam expansion chamber of a faucet with the vent associated with an opening through which cleaning liquid can be introduced into the chamber; to provide a valve structure compensatory for wear and inequalities in machining to obtain the best valving action; and generally to provide an efficient, shapely and sightly faucet construction.

Features include all details of construction shown in the drawings, along with the broader ideas of means inherent in the disclosure.

Objects, features and advantages of the invention will be set forth in the description of the drawings forming a part of this application, and in said drawings Figure 1 is a longitudinal section illustrating our system including a beer dispensing faucet, and a foam reducing chamber in the supply line leading to the faucet;

Figure 3 is a plan view of Figure 1 with the closure cap removed;

Figure 4 is a vertical section taken approximately on line 4—4 of Figure 3 showing electrical connections and switch for the signal light;

Figure 5 is a bottom plan view of the cap;

Figure 6 is a longitudinal section showing a modification;

Figure 7 is a plan section taken substantially on line 7—7 of Figure 6;

Figure 8 is a detail cross-section on line 8—8 of Figure 6; and

Figure 9 is a vertical longitudinal section of a modification showing means by which sand is kept from the spring socket, during cleaning of the valve.

Figure 1:
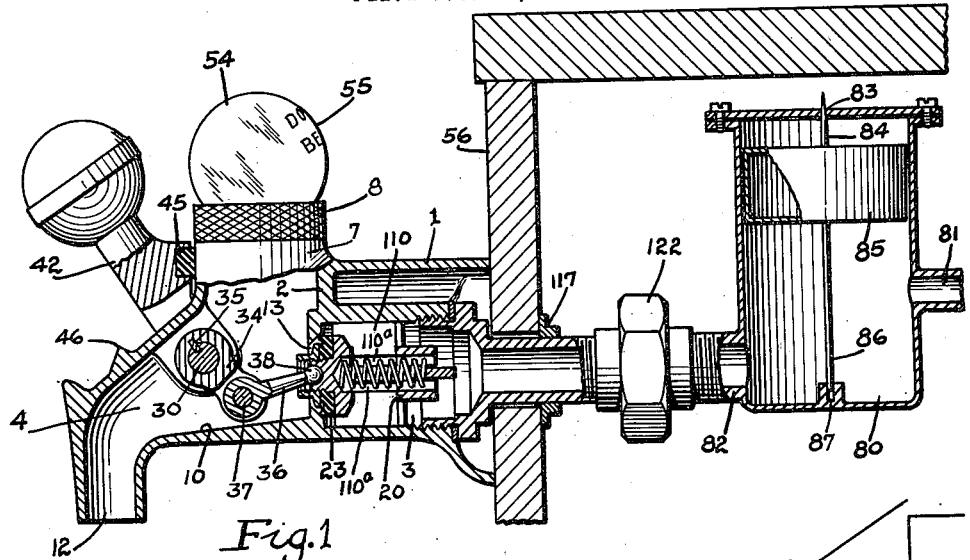

Referring first to Figure 1: The faucet has a body generally indicated at 1, which is divided by a wall 2 into a rear valve chamber 3 and into a relatively elongated front dispensing chamber 4, having a relatively large cross-sectional area which is substantially greater than that of the rear or valve chamber. This forward chamber has an upward tubular extension 7 closed by a cap 8, this hollow extension being for the purposes of inspection, and for introducing cleaning fluid into the front chamber. The front chamber has an elongated bottom 10 slanting only slightly downward from the horizontal, and from the wall 2, and leading to a downwardly directed discharge orifice or extension 12.

In the wall 2 is a relatively large orifice 13, which has a diameter almost as great as that of the rear chamber. A valve closes the orifice by motion in the direction of delivery of the liquid, and the valve is opened against the pressure of the liquid. The valve is self-closing.

Figure 2:
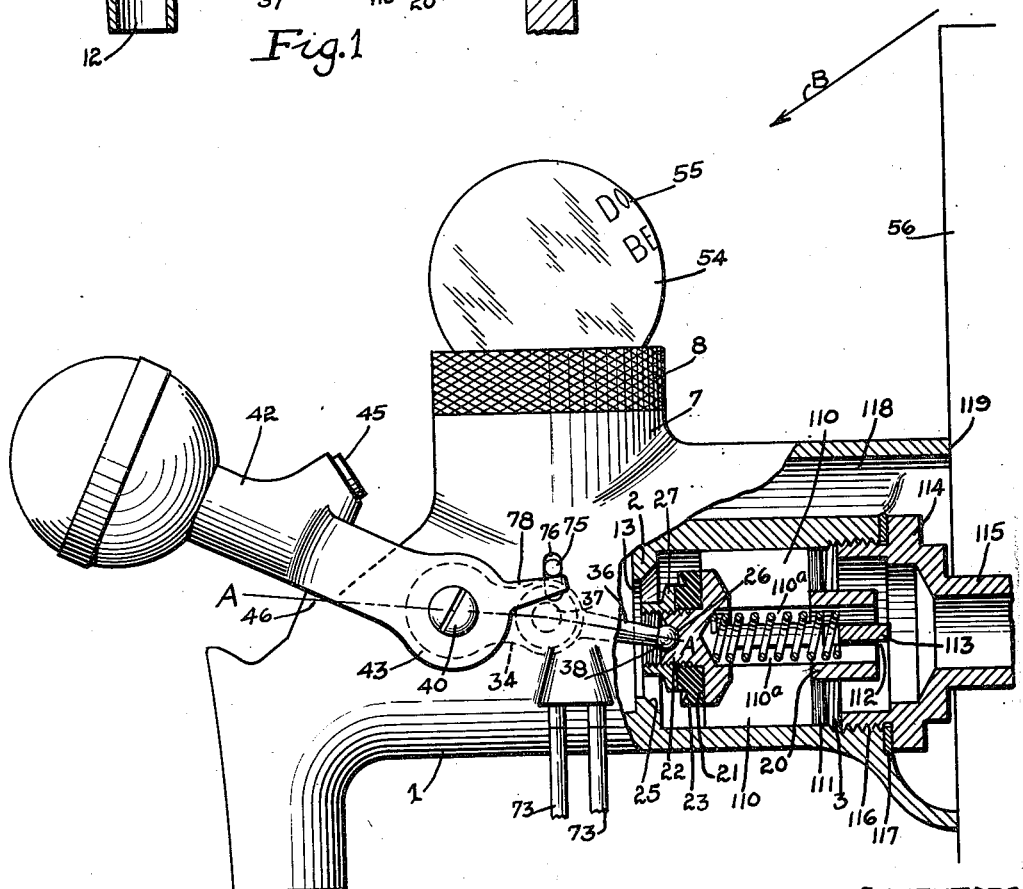
Figure 2 is a sectional elevation of a faucet structure similar to that of Figure 1.

The valve structure is believed to be novel and is claimed herein. It comprises a tubular member 20 having a head having a flat shoulder or surface 21, and a threaded extension 22 projecting forwardly from the surface 21. A suitable valving washer 23 is centered by the extension and engages the shoulder as shown. This washer, in this case of rubber, has a knife-edge which cooperates with the beveled or frusto-conical surface 25 of the orifice 13. The outer or forward surface of the extension 22 has a conico-spherical depression 26 therein, and a clamping collar 27 has threads cooperating with threads of the extension to hold the washer in place and also to form a housing extending outwardly from the depression 26. Suitable valve operating means includes a thrust element having a spherical head engaging in the depression. The operating means is also a feature. We now refer to Figure 7 which is a section on line 7—7 of Figure 6: Means for controlling the valve includes a rotatable shaft 30 horizontally traversing one wall of the body, said shaft being rotatably stepped in the opposite wall of the body as at 31, but not traversing that wall. A stuffing box for the shaft is indicated at 32. Arm 34 is keyed to the shaft as at 35 and lies within the chamber, and a thrust member 36 see Figures 1 and 2 is pivoted as at 37 to the arm 34. This thrust member in this instance has a ball 38 pivotally cooperating with the depression 26 of the extension 22 of the valve. By means of this thrust connection, the valve is caused to open as the pivotal points of the elements approach alignment, and it is noted that the valve is automatically held open when the pivotal centers are aligned as indicated by line A—A of Figure 2. It is further noted that the pivotal thrust connection is acted upon by the self-closing valve to automatically return the lever to valve-closed position, as soon as the lever 35 is moved sufficiently to disalign the pivotal centers.

Referring to Figure 7, the valve control mechanism also includes a pin 40 at the outer side of the body non-rotatably held in said opposite wall and axially aligned with the shaft 30. A lever 42 has fork elements 43 straddling the body, one fork element being fixed to the rotatable pin 30 and the other fork element being rotatable on the pin 40. The extreme positions of lever movement are respectively shown in Figures 1 and 2, the lever being provided with a cushion 45 operating against the extension 7 as a stop when the lever is in valve-closed position and the body being provided with a stop 46 for limiting lever movement at valve-open position.

Another feature of the invention relates to the construction best shown in Figures 2 to 5 inclusive. Referring to Figure 4, the cap 8 is in threaded connection with the extension 7 as at 50 and this cap has radial vent openings 51 which, when the cap is tightly screwed down, cut off communication between the chamber 4 and the atmosphere. Atmospheric communication can be established by partially unscrewing the cap. Under certain conditions of use, it is desirable to establish this communication and under other conditions, it is not desirable. The tubular extension provides an opening through which cleaning material can be introduced into the chamber.

Another feature relates to the provision of a signal light indicating that the valve is open, and for illuminating advertisement or other indicia so placed as always to be in view of the customer. In this instance, the signal can operate only when this advertising or other matter is made to occupy a predetermined relation to the customer or to the body of the faucet. The body always has a certain predetermined relation to the customer, being generally placed at one side of a counter at the oposite side of which the customer is standing or seated. The cap must be in place if the faucet is to be properly operated to dispense beer, and thus the combination performs the new function of forcing the user of the faucet to show the customer what brand of beverage is being dispensed before the faucet can properly dispense the liquid.

The cap is provided with a suitable electric light socket 52, the electric light bulb being indicated at 53. The globe is indicated at 54 and the advertising indicia is indicated at 55, see Figure 2. It will be noted that this advertising matter is so placed as to be viewed by a customer looking in the direction of the arrow B from the opposite side of the bar or counter 56. The socket 52 is arranged in suitable insulating material 55 and has a radially disposed conducting element 57 connected therewith. The contact of the bulb is in electrical contact with another radially disposed conducting element 58. The relation of these elements is shown in Figure 5. To the outer end of the conducting element 57 is attached a conducting element 59, see Figure 5, and to the outer end of the conducting element 58 is attached a cylindrical conducting element 60.

An object is to cause the bulb to be energized when the valve control means is moved to open the valve, and the electrical means includes parts which maintain electrical contact with the bulb either when the cap is screwed to its inner limit or only after the cap is given one or a number of complete turns. To this end, see Figure 4, a vertical opening 62 is provided in the body, and in this opening is disposed an insulating sleeve 63 slotted as at 64. Within this sleeve is a movable contact 65, and a movable contact 66, between which contacts is a spring 67 tending to push the contact 65 against the contact 60 of the cap. A switch element 68 is slidable in the insulating tube and is adapted when moved upwardly against the action of the spring 69 to make contact with the contact 66 and close a circuit through the lamp. An insulating washer 69ª is interposed between the upper end of the spring and the contact 66. The switch element 68 has an upper reduced end adapted to make contact with the element 66 and also has a lower reduced end which slides in and is in conducting contact with a conducting tube 70 arranged within the insulating tube. With this conducting tube is conductingly engaged the plug 72 of a line wire 73.

The other conducting construction, not shown in its entirety, is the same as the one just described, except that there is no movable switch element 68, the sleeve 70 being extended to contact with the conducting element 66. It is believed that the construction will be clear to those skilled in the art, without further description or illustration. To differentiate, however, the numeral 65ª has been applied in Figure 3 to the movable contact, which engages with the stationary contact 59, see Figure 5.

It will be noted that only when the cap is in an angular position at which elements 60—65 and 59—65ª are in contact can a circuit to the lamp be completed. This conducting condition, however, will be maintained if from the fully closed position, the cap is rotated one or more complete revolutions, each complete unscrewing revolution bringing the parts 60—65 and 59—65ª again in conducting relation. This is a feature of the invention, as well as the relative arrangement of the advertising matter 55 to the body or to the counter 56 and to the cap. This indicia will be in a position viewable by a customer either when the cap is in the limit position shown in Figures 1, 2 and 4, or when it is turned one or more complete revolutions from that initial or limit position, to position the vent opening 51 for establishing atmospheric communication with the forward chamber 4.

The switch element 68 is provided with a lateral extension generally indicated at 75 passing through the slot 64 of the insulating tube and through another slot 76 of the body wall. The extension is covered with insulating material, and is engaged by an arm 78 on one fork element 43 of the handle 42. In Figure 2 the pin 75 has been raised to switch-closed position against the action of the spring 69, and the signal is operative, the valve being open as shown.

The above feature is a valuable one to advertise and sellers of beer inasmuch as brewers and others spend thousands of dollars for various forms of advertising to induce persons to ask for their brand of beer. Our invention provides, in combination, means on the faucet indicating the source of the beer, and arranged on a part of the faucet which is necessary to its operation (in that the cap must be closing the extension) and the signal means is so arranged that unless this advertising matter always occupies the same predetermined position relative to the body or to the customer, the signal will not operate. To the informed customer this will be noticeable and will elicit his inquiry as to the cause. This predetermined position can of course be varied but it is always such that the symbol or brand mark can be seen by the customer.

Another feature of the invention relates to a foam reducing device, shown in Figure 1, and adapted to reduce foaming of beer dispensed through a beer faucet. This device is usable in combination with types of faucets other than that herein claimed. A source of supply of gascharged liquid is assumed which liquid is capable of foaming. The liquid may be beer, or other analogous substance. A free flow connection between the source of supply and the faucet is provided. A tank or chamber 80 is interposed in this connection or line as shown. In practice, the source of supply connects with the tank by means of the connection 81. Another free flow connection generally indicated at 82 is provided between the chamber and the faucet. The tank 80 has a vent opening 83 in its upper wall and a needle valve 84 controls this opening, the valve being carried by or operated by a float 85. The float has a downward extension 86 guided in a socket 87. The movement of the float is slight and responds to variations in pressure in the tank 80 or in the line. A change of liquid level resultant from opening of the faucet valve operates the float to open the vent, and vice versa. When the faucet valve is open the vent is opened, and some carbon dioxide escapes from the liquid through the vent. This device has been found particularly valuable for controlling beer, and can be used successfully with ordinary types of beer valves. The device is however particularly efficient in combination with the valve of the present invention, and with the valve of our copending application Serial Number 703,372, previously referred to.

Another feature of the invention is shown in Figure 6 and relates to a valve construction with means so connecting the valve with its operating member as to allow and obtain automatic and non-automatic adjusting motions of the valve compensatory for wear and for slight inequalities in machining of the parts, to obtain and maintain proper fit of the valving surfaces.

In this case, the invention is applied to a type of beer dispensing faucet which has forward and rear valves, the rear valve controlling entry of the beer into a front chamber and the front valve controlling exit of the beer from that chamber into a glass. In this case, the arm 34 is drilled as shown to provide communicating passages 90 and 91, the latter being of smaller diameter than the former to provide a shoulder against which spring 92 abuts. The passage 90 has slidable therein a ring 93 providing at its outer side a spherical socket 94 cooperating with a semi-spherical ball 95 carried by a stem or pin 96. The valve disk generally indicated at 97 is carried by the stem or pin and is held by nut 98 against a shoulder formed by the ball 95. The diameters of the stem, passage 91 and ring 93 are so sized that the pin can swing about the ball and socket joint as a center, the spring yieldingly pressing the valve to seating position, and the ball and socket joint being held in operative condition by the action of the spring.

Another feature of the invention which is also shown in Figures 6 and 7 is the construction of a valve-operating thrust member which is connected at one end by a pin 37ᵃ with the arm 34, and has a ball and socket thrust connection with the valve, as previously described, and as shown in Figures 1 and 2. This thrust member is composed of telescoping sections. That section which is held in pivotal relation by the pin 37ᵃ has the form of a hollow cylinder, and is indicated at 100 and the other section is indicated at 101, and has an extension 102 acting against the closed end of the other section as a stop. A spring 103 surrounds the extension 102 and presses the element 101 into socketed relation with the valve. Although the thrust principle is generally the same as that shown in Figure 1, it is applied here in a double valve structure so that the second valve is opened after the first opens, and the first is closed after the second closes. This general scheme is also shown in our copending application previously referred to, but in that application neither the ball and socket thrust connection is shown, nor a two-part thrust connection having a ball and socket relation with the valve.

Another feature of the invention best shown in Figures 2, 6 and 7 relates to the mounting of the reciprocable valve disk-carrying member 20, this construction being shown also in Figure 1. This member 20 is, as before mentioned, faced with a soft rubber ring 21, which ring has a knifeedge valving relation with the conical seat. The member has four guide fins 110 arranged as best shown in dotted lines in Figure 4. The inner end of each fin is beveled as at 111. The rear end of the tubular member 20 is diametrically slotted as at 112, the resultant slots being adapted to slidably cooperate with a diametrically related bar or member 113, held by, and in this instance made an integral part of, a head 114 which is integral with a free-flow pipe connection 115. The slots and element 13 cooperate to prevent rotation of the tubular element 20, at the same time allowing translation for opening and closing the valve. A valve-closing spring in the member 20 abuts that member and the bar 113. The head 114 is of course in threaded connection with the faucet at 116 and this head can be quickly detached to give entry to the valve mechanism for repair or replacement. A suitable washer 117 is interposed as shown to make a liquid-tight connection.

Another feature relates to the formation of the dead air space insulating chamber 118 partly around the rear valve chamber. The rear surface 119 of the faucet is in sealing engagement with any suitable surface indicated at 120, and is so held by the head 114, pipe 115 and washer 117 threaded on the pipe. The element 115, which is part of the line from the source of liquid supply, is of relatively large cross-section and because of this has been referred to as a free flow connection. A suitable union 122 connects this pipe section 115 with a similar section or extension of the tank or chamber 80.

Another feature relates to the arrangement of an extension 8ª of Figure 6. This extension has its upper surface 8ᵇ at an angle with the long axis of the faucet, and faces rearwardly or toward the connecting end of the faucet. A cap 8ᶜ sealingly closes the extension. The extension is sufficiently long and the upper surface of the cap is at such an angle that indicia, such as a brand mark, placed upon that surface can be seen by a person at the opposite side of a counter 121, with which the faucet is associated.

Although we claim herein all of the new details of construction which are shown in the drawings, yet there is no intention to be entirely limited to these details, because the invention is broader.

The slight downward slant of the bottom 10 is an important feature in preventing dripping which would take place if the surface 10 were horizontally arranged. It is particularly important in the device of the present invention, in which foam cut-off is to be obtained as a result of reduced velocity of flow of the liquid between the valve and the outlet.

Another feature of the invention relates to the construction of Figure 9 for preventing entry of sand into the spring socket when the valve is cleaned with a mixture of sand and water usually used for this purpose. Without this construction, the deposit of sand, as a result of frequent washing, eventually reduces the efficiency of the spring by interfering with the motions of its coils, so that the valve does not properly operate.

The general structure of Figure 9 is the same as that shown in the other figures, with the exception that the outer end of the spring socket 130 of the rear extension of the valve is in this instance closed by a pin 131. This pin has a sliding fit in the bore 130 sufficient to allow the proper valve operation, but tight enough to prevent the entry of sand. This plug is separate from but abuttingly engages the central portion 132 of a spider 133, the spider in this instance having three legs. By having the plug 131 separate from the spider, the plug may adjust itself relatively to the spider and socket to compensate for any inequalities in machining, and yet will unfailingly act to prevent entry of sand. The spider has a press fit within the head 114 and is limited in its movement by and engages a shoulder 134 formed by counter-boring the head as at 135.

Another form of the invention is shown in Figures 6 and 8, as well as the other figures of the drawings with the exception of Figure 9. In this form, the tubular portion 20 of the valve, at points between the fins 110, is provided with openings 110ª to allow passage of cleaning liquid, but prevent trapping of the sand in the spring socket, when the usual sand and water mixture is run through the valve to clean it. The structure of Figure 9 is such as to prevent entry of sand into the socket; that of Figure 6 and the other figures to allow entry, but prevent retention of the sand. Both forms are features of the invention.

We claim as our invention:

1. A faucet having a body divided by a wall into a rear valve chamber and into a front dispensing chamber having a relatively large cross-sectional diameter which is substantially greater than the diameter of the rear valve chamber, said chamber having an elongated bottom slanting only slightly downwardly from the horizontal and from the wall, and leading to a forwardly placed and downwardly directed discharge orifice, said division wall having a relatively large orifice, a valve closing the orifice by motion in the direction of delivery of the liquid, and means for operating the valve, a source of supply of gas-charged liquid under pressure which liquid is capable of foaming, and a free flow connection between said source and said rear chamber.

2. In combination with a faucet having a body divided to provide a liquid dispensing chamber providing an outlet passage, a valve controlling entry of liquid into the chamber, means in part passing through the chamber for controlling the valve, an opening in the body through which cleaning material can be introduced into said chamber, a cap for said opening in threaded engagement with the body and having a vent opening which is adapted only when the cap is partly unscrewed to establish communication between the atmosphere and the chamber.

3. In combination, a faucet having a body divided to provide a liquid dispensing chamber, providing an outlet passage, a valve controlling entry of liquid into the chamber, means in part passing through the dispensing chamber for controlling the valve, an opening in the body through which cleaning material can be introduced into the said chamber, a cap for the opening in threaded engagement with the body, an electric light bulb as signaling means carried by the cap at its outer side, electrical and mechanical means by which the lamp is energized when the valve control means is moved to open the valve, the electrical means including parts which maintain electrical contact with the bulb when the cap is screwed to its inner limit.

4. In combination a faucet having a body divided to provide a liquid dispensing chamber providing an outlet passage, a valve controlling entry of liquid into the chamber, means in part passing through the chamber for controlling the valve, an opening in the body giving access to the chamber, a cap for the opening in threaded engagement with the body and having a vent opening which is adapted only when the cap is partly unscrewed to establish communication between the atmosphere and the chamber, an electric light bulb carried by the cap at its outer side, electrical and mechanical means by which the bulb is energized when the valve control means is moved to open the valve, the electrical means including parts which maintain electrical contact with the bulb when the cap is screwed to its inner limit, and thereafter only after the cap is given one or a number of complete turns.

5. In combination, a faucet having a body divided to provide a liquid dispensing chamber providing an outlet passage, a valve controlling entry of liquid into the chamber, means in part passing through the chamber for controlling the valve, an opening in the body giving access to the chamber, a cap for the opening in threaded engagement with the body, and having a vent opening adapted only when the cap is partly unscrewed to establish communication between the atmosphere and the chamber, an electric light bulb carried by the cap at its outer side, a housing carried by the cap and having indicia thereon adapted to be illuminated by the bulb, and adapted when the cap is screwed to its inner limit to occupy a predetermined positional relation to the spigot body, electrical and mechanical means by which the bulb is energized when the valve control means is moved to open the valve, the electrical means including parts which maintain electrical contact with the bulb when the cap is screwed to its inner limit, and thereafter only when the cap is given one or a number of complete turns, whereby electrical contact to the bulb is only maintained when the indicia is in the aforesaid predetermined positional relation to the body.

6. A faucet having a body having a dispensing chamber with a discharge orifice including a valve seat, valve-operating means including a shaft journaled in the body and having an arm within the chamber, a valve cooperative with the seat, and means connecting the valve with the arm in a manner to allow automatic and non-automatic adjusting motions of the valve, compensatory for wear and for inequalities in machining of the parts, to obtain and maintain proper fit of the valving surfaces.

7. A faucet having a body having a dispensing chamber with a discharge orifice including a valve seat arranged at the orifice, valve-operating means including a shaft journaled in the body and having an arm within the chamber, a valve cooperative with the seat, said arm having a passage and said valve having a stud translatable in the passage, a spring for yieldably pressing the valve to seating position, and means allowing automatic and non-automatic adjusting motions of the valve, compensatory for wear and for inequalities in machining of the parts, to obtain and maintain proper fit of the valving surfaces.

8. A faucet having a body having a dispensing chamber with a discharge orifice including a valve seat arranged at the orifice, valve-operating means including a shaft journaled in the body and having an arm within the chamber, a valve cooperative with the seat, said arm having a passage and said valve having a stud translatable in the passage, a spring for yieldably pressing the valve to seating position, and means allowing automatic and non-automatic adjusting motions of the valve, compensatory for wear and for inequalities in machining of the parts, to obtain and maintain proper fit of the valving surfaces, said means including a ball and socket joint, held in operative condition by action of the spring.

9. A faucet having a body having a dispensing chamber with a discharge orifice including a valve seat arranged at the orifice, valve-operating means including a shaft journaled in the body and having an arm within the chamber, a valve cooperative with the seat, and means connecting the valve with the arm in a manner to allow automatic and non-automatic adjusting motions of the valve, compensatory for wear and for inequalities in machining of the parts, to obtain and maintain proper fit of the valving surfaces, a self-closing second valve controlling entry of liquid into the chamber, and means having pivotal relations respectively with said arm and the second valve and adapted on motions of the arm to open the second valve after the first opens and to close the first after the second closes.

10. A faucet having a body divided to provide a dispensing chamber, having a discharge orifice, a self-closing valve controlling entry of liquid into the chamber, means for controlling the valve including a rotatable shaft traversing one wall of the body, said shaft being rotatably stepped in but not traversing the opposite wall of the body, a stuffing box for the shaft, an arm keyed to the shaft within the chamber, a thrust member pivoted to the arm and having a pivotal thrust connection with the valve to open it as the pivotal points of the elements approach alignment and to automatically hold the valve in open position when the pivotal centers are substantially aligned, a pin at the outer side of the body non-rotatably held in said opposite wall and axially aligned with the shaft and a lever having fork elements straddling the body, one fork element being fixed to the rotatable shaft and the other fork element being rotatable on the pin, the pivotal thrust connection acting to open the valve and in turn being acted upon by the self-closing valve to automatically return the lever to valve-closed position after disalignment of the pivotal centers.

11. In combination with a faucet having a valve, a source of supply of gas-charged liquid which liquid is capable of foaming, a supply connection between the source and the faucet, a float chamber interposed in said supply connection as part thereof, and having a vent opening in one wall, a valve controlling the vent opening, and a float in said float chamber controlling the valve, a change of liquid level resultant from opening of the faucet valve operating the float to open the vent, and vice versa.

12. A faucet having a dispensing chamber, a source of supply of gas-charged liquid under pressure which liquid is capable of foaming, a float chamber and a pipe connecting the source with said float chamber, a flow connection between said float chamber and the dispensing chamber, a valve for controlling liquid flow from the flow connection into said dispensing chamber, a vent opening in the wall of said float chamber, a valve controlling the vent opening, and a float in said float chamber controlling the valve, and operating to open the vent valve when the faucet valve is opened, and vice versa.

13. A faucet having a body divided by a wall into a rear valve chamber and a front dispensing chamber, the body having an upwardly directed hollow extension in communication with said forward chamber, the extension having its upper surface at an angle with the long axis of the faucet and facing rearwardly or toward the connecting end of the faucet, a removable cap sealingly closing the upper end of the extension, the extension being sufficiently long and the upper surface of the cap being at such an angle, that indicia placed thereon may be seen by a person at the opposite side of a counter with which the faucet is associated.

14. A faucet having a body providing a dispensing chamber and a valve chamber, a valve in the valve chamber controlling entry of fluid into the dispensing chamber, a supply connection between a source of liquid supply and said valve chamber including a head detachably secured to the body and closing the valve chamber, said valve including a tubular extension which is slotted and said head having a bar slidably received by the slot to prevent valve rotation, and a spring in the tubular extension abutting the bar and acting to seat the valve.

15. A faucet having a body providing a dispensing chamber and a valve chamber, a valve in the valve chamber controlling entry of fluid into the dispensing chamber, a supply connection between a source of liquid supply and said valve chamber including a head detachably secured to the body and closing the valve chamber, said valve including a tubular extension which is slotted diametrically at the rear end and said head having a diametrically disposed bar slidably received by the slots to prevent valve rotation, and a spring in the tubular extension abutting the bar and acting to seat the valve.

16. In combination with a faucet having a valve, a source of supply of gas-charged liquid, which liquid is capable of foaming, a float chamber having a vent opening in one wall, a valve controlling the vent opening and a float in said float chamber controlling the valve, a flow connection between said chamber and faucet valve, a flow connection between the source of supply and said float chamber, the flow capacity of the first mentioned flow connection and said valve being substantially greater than the flow capacity of the last mentioned connection.

17. In combination, a faucet having a body divided to provide a liquid dispensing chamber, providing an outlet passage, a valve controlling entry of liquid into the chamber, an opening in the body through which cleaning material can be introduced into said chamber, a cap for the opening in threaded engagement with the body, an electric lamp as signalling means carried by the cap, and electrical and mechanical means by which the lamp is energized when the valve is opened.

18. In combination with a faucet having a valve chamber, a valve in said chamber having a spring socket and valve-operating spring therein, a pin slidable in said spring socket and adapted to prevent entry of sand into said socket, and abutting the spring, said pin projecting beyond the socket, and stationary means which the pin abuts for limiting its movement under the applied force of the spring.

19. A faucet having a body having a dispensing chamber with a discharge orifice including a valve seat, valve-operating means including a shaft journaled in the body, a valve cooperative with the seat and means connecting the valve with the shaft at a point within the chamber and eccentric to the rotative axis of the shaft in a manner to allow automatic adjusting motions of the valve compensatory for wear and for inequalities in the machining of the parts, to obtain and maintain proper fit of the valving surfaces.

20. A faucet having a body adapted to be horizontally disposed and having an outlet passage, and having a valve and operating means therefor, the faucet body having an upwardly directed tubular extension for the introduction of cleaning fluid into the body forwardly of the valve and between the valve and the outlet passage, and a closure cap detachably secured to said extension in slanting relation to the long axis of the body and having its outer surface facing toward the rear, or to that end of the body which is attached to the source of supply, and making an acute angle with the long axis of the body.

21. In combination with a faucet having a translatable self-closing valve having a socket, means for controlling the valve including as parts, a shaft, a thrust element and means pivoting it to said shaft within the faucet, said thrust element having a pivotal thrust engagement in said socket, the pivotal relations of said parts being such that the valve is releasably locked in open position after the valve control means has been moved to a corresponding position.

22. In combination with a faucet having a forward discharge chamber and a rear valve chamber which rear chamber is connected with the source of supply, a valve in said chamber closing in a direction of the discharge chamber and having a spring socket and valve operating spring therein, a pin slidable in said spring socket and adapted to prevent entry of sand, and abutting the spring, said spring projecting beyond the socket, and means which the pin abuts for limiting its movement under the applied force of the spring.

PETER M. REILAND.
ERNEST S. REILAND.